United States Patent
Leachman et al.

(10) Patent No.: US 7,185,495 B2
(45) Date of Patent: Mar. 6, 2007

(54) SYSTEM AND METHOD FOR IMPROVING THERMAL EFFICIENCY OF DRY LOW EMISSIONS COMBUSTOR ASSEMBLIES

(75) Inventors: David Paul Leachman, Cincinnati, OH (US); Edward David Sailer, Cincinnati, OH (US); John Eric Bloomberg, West Chester, OH (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 10/935,347

(22) Filed: Sep. 7, 2004

(65) Prior Publication Data

US 2006/0059919 A1   Mar. 23, 2006

(51) Int. Cl.
F02C 1/00 (2006.01)
(52) U.S. Cl. .............................. 60/772; 60/782; 60/785
(58) Field of Classification Search ................. 60/773, 60/774, 782, 785, 791, 795, 39.511, 726, 60/737
See application file for complete search history.

(56) References Cited

U.S. PATENT DOCUMENTS

| | | | |
|---|---|---|---|
| 2,625,012 A | 1/1953 | Larrecq | |
| 2,669,092 A | 2/1954 | Hammaren | |
| 3,518,830 A | 7/1970 | Viscovich et al. | |
| 3,754,393 A | 8/1973 | Handa | |
| 3,785,145 A | 1/1974 | Amann | |
| 4,083,181 A | 4/1978 | Adamson | |
| 4,106,286 A | 8/1978 | Sakai et al. | |
| 4,163,365 A * | 8/1979 | Frutschi ........................ | 60/773 |
| 4,204,401 A | 5/1980 | Earnest | |
| 4,271,664 A | 6/1981 | Earnest | |
| 4,896,499 A | 1/1990 | Rice | |
| 5,197,278 A | 3/1993 | Sabla et al. | |
| 5,211,004 A | 5/1993 | Black | |
| 5,259,184 A | 11/1993 | Borkowicz et al. | |
| 5,285,632 A | 2/1994 | Halila | |
| 5,323,604 A | 6/1994 | Ekstedt et al. | |
| 5,335,501 A | 8/1994 | Taylor | |

(Continued)

OTHER PUBLICATIONS

P. Fletcher, "Operation of Gas Turbo-Compressors and Turbines—Environmental Aspects," International Conference held at Hotel Devin, Bratislava, Apr. 27-28 2004, 2 pages.

*Primary Examiner*—William H. Rodriguez
(74) *Attorney, Agent, or Firm*—Jagtiani & Guttag

(57) ABSTRACT

A gas turbine engine system having improved thermal efficiency, which comprises: (1) an inlet air stream; and (2) a dry low emissions combustor assembly having an air inlet for receiving the inlet air stream, at least one bleed air port and an air outlet for discharging at least a portion of the received air from the inlet air stream. This system includes a source of warmer air capable of raising the ambient temperature of the inlet air stream received by the air inlet of the dry low emissions combustor assembly while operating at a partial load until the system reaches a new equilibrium state having improved thermal efficiency. Also disclosed is a method for improving the thermal efficiency of the dry low emissions combustor assembly, which comprises the step of including a source of warmer air with the inlet air stream received by the air inlet of the dry low emissions combustor assembly while operating at a partial load until the system reaches a new equilibrium state having improved thermal efficiency.

20 Claims, 7 Drawing Sheets

U.S. PATENT DOCUMENTS

| | | | |
|---|---|---|---|
| 5,479,772 A | 1/1996 | Halila | |
| 5,551,227 A | 9/1996 | Moulton et al. | |
| 5,619,855 A | 4/1997 | Burrus | |
| 5,623,827 A | 4/1997 | Monty | |
| 5,678,408 A * | 10/1997 | Janes | 60/728 |
| 5,737,915 A | 4/1998 | Lin et al. | |
| 5,791,148 A * | 8/1998 | Burrus | 60/752 |
| 5,896,740 A | 4/1999 | Shouman | |
| 5,911,679 A | 6/1999 | Farrell et al. | |
| 6,003,298 A | 12/1999 | Horner | |
| 6,065,280 A | 5/2000 | Ranasinghe et al. | |
| 6,065,283 A | 5/2000 | Shouman | |
| 6,195,607 B1 | 2/2001 | Rajamani et al. | |
| 6,200,128 B1 | 3/2001 | Kobayashi | |
| 6,233,940 B1 | 5/2001 | Uji | |
| 6,405,521 B1 * | 6/2002 | Ranasinghe et al. | 60/775 |
| 6,415,594 B1 | 7/2002 | Durbin et al. | |
| 6,438,961 B2 | 8/2002 | Tuthill et al. | |
| 6,484,503 B1 | 11/2002 | Raz | |
| 6,499,303 B1 * | 12/2002 | Polukort et al. | 60/775 |
| 6,513,318 B1 * | 2/2003 | Wright | 60/39.511 |
| 6,530,224 B1 | 3/2003 | Conchieri | |
| 6,543,234 B2 * | 4/2003 | Anand et al. | 60/772 |
| 6,564,555 B2 | 5/2003 | Rice et al. | |
| 6,581,369 B1 | 6/2003 | Kaufman | |
| 6,606,864 B2 * | 8/2003 | MacKay | 60/773 |
| 6,651,439 B2 | 11/2003 | Al-Roub et al. | |
| 2002/0152754 A1 * | 10/2002 | MacKay | 60/772 |
| 2004/0065073 A1 * | 4/2004 | Nash | 60/39.511 |
| 2004/0098965 A1 * | 5/2004 | Dettmer | 60/39.511 |
| 2004/0144099 A1 * | 7/2004 | Coleman et al. | 60/791 |
| 2005/0056022 A1 * | 3/2005 | Held et al. | 60/772 |
| 2005/0172635 A1 * | 8/2005 | Carlson et al. | 60/775 |
| 2006/0010876 A1 * | 1/2006 | Hoffmann et al. | 60/773 |

* cited by examiner

SYSTEM AND METHOD FOR IMPROVING THERMAL EFFICIENCY OF DRY LOW EMISSIONS COMBUSTOR ASSEMBLIES

TECHNICAL FIELD OF THE INVENTION

This invention relates to a gas turbine engine system for improving the thermal efficiency of a dry low emissions combustor assembly that uses "bleed air". This invention further relates to a method for improving the thermal efficiency of such a dry low emissions combustor assembly.

BACKGROUND OF THE INVENTION

Gas turbine engines are used for a variety of purposes where large amounts of power are required at high efficiency. While gas turbine engines are commonly used in aircraft transportation because of these characteristics, they can also be used to provide power for other applications including marine craft and land-based electrical power generation. These engines are comprised of a series of stages that are operated on a single power shaft or can be operated using a plurality of shafts to efficiently provide high output energy. Typically, these stages include, in the order in which incoming air passes through them, a low pressure compressor, a high pressure compressor, a combustor, a high pressure turbine, and a low pressure turbine. See commonly assigned U.S. Pat. No. 5,323,604 to Ekstedt et al, issued Jun. 28, 1994.

Air pollution concerns worldwide have led to stricter emissions standards requiring significant reductions in gas turbine pollutant emissions, especially for industrial and power generation applications. Nitrous Oxide (NOx), which is a precursor to atmospheric pollution, is generally formed in the high temperature regions of the gas turbine combustor by direct oxidation of atmospheric nitrogen with oxygen. One technique for the reducing of gas turbine emissions is "lean premix" combustion, where the fuel is burned at a lower temperature. By "lean premix," it is meant that the fuel/air mixture contains more air than is required to fully combust the fuel, or an equivalence ratio of less than one.

A combustor utilizing this "lean premix" concept is commonly referred to as a "dry low emissions" combustor. One such "dry low emissions" combustor is disclosed in commonly assigned U.S. Pat. No. 5,323,604 (Ekstedt et al), issued Jun. 28, 1994, and comprises three separate or annular domes, with each dome having disposed therein a plurality of circumferentially spaced mixers for uniformly mixing air and fuel. To provide low fuel-air ratios at maximum power where the fuel flow rate is high, the triple annular or dome Ekstedt et al combustor utilizes approximately 80–90% of the total combustion air in the dome. This is achieved by having a large number of fuel/air mixers to accommodate high dome flow so that the combustor is able to operate in a temperature range that minimizes NOx, carbon monoxide (CO), and unburned hydrocarbons (UHC). See also commonly assigned U.S. Pat. No. 5,197,278 (Sala et al), issued Mar. 30, 1993 for a double dome combustor of the "dry low emissions" type.

To utilize approximately 80–90% of the total combustion air in the dome, "dry low emissions" combustors such as the Ekstedt et al combustor employ a diffuser to diffuse the compressed inlet air stream to be supplied to the combustor. One such diffuser used with the Ekstedt et al combustor is disclosed in commonly assigned U.S. Pat. No. 5,335,501 (Taylor), issued Aug. 9, 1994, and comprises a plurality of splitter vanes to better spread the airflow radially. The Taylor diffuser is also typically equipped with a plurality of compressor bleed ports that extend radially outwardly from the diffuser. In those instances where the "dry low emissions" combustor (e.g., Ekstedt et al combustor) is not operating at peak power or full load (e.g., where the operation of the combustor is scaled or "throttled" back), a portion of the air entering the Taylor diffuser is usually diverted or "bled" through these bleed ports to maintain stable combustion, i.e., smooth transitions between combustor modes without excessive acoustics, and without lean "blow out."

This "bleed air" can typically represent up to about 12% of the total compressor inlet air stream to the diffuser. While "bleed air" is necessary to maintain stable combustion in "dry low emissions" combustors of the Ekstedt et al type, it also considerably increases the heat rate (i.e., lowers thermal efficiency) of the combustor. This causes a significant fuel burn penalty for "dry low emissions" combustors when "bleed air" is required, compared to other combustors that do not require "bleed air." Accordingly, it would be desirable to be able to improve the thermal efficiency of such "dry low emissions" combustors that require "bleed air" during those periods when not operating at full load, i.e., when operating at a partial load or in a "throttled" back state. It would further be desirable to be able to improve the thermal efficiency of such "dry low emissions" combustors while keeping emissions within desired limits while operating in such a partial load or "throttled" back state.

BRIEF DESCRIPTION OF THE INVENTION

An embodiment of this invention relates to a gas turbine engine system having improved thermal efficiency. This system comprises:
(1) an inlet air stream; and
(2) a dry low emissions combustor assembly having an air inlet for receiving the inlet air stream, at least one bleed air port and an air outlet for discharging at least a portion of the air received from the inlet air stream.

This system further includes a source of warmer air capable of raising the ambient temperature of the inlet air stream received by the air inlet of the dry low emissions combustor assembly while operating at a partial load until the system reaches a new equilibrium state having improved thermal efficiency.

Another embodiment of this invention involves a method for improving the thermal efficiency of the dry low emissions combustor assembly, which comprises the step of including a source of warmer air with the inlet air stream received by the air inlet of the dry low emissions combustor assembly while operating at a partial load until the system reaches a new equilibrium state having improved thermal efficiency.

The gas turbine engine system and method of this invention provides several benefits for dry low emissions combustor assemblies, including: (1) improving the thermal efficiency of such combustor assemblies when not operating at full load, i.e., when operating at a partial load or in a "throttled" back state, and especially avoiding significant fuel burn penalties; (2) providing the ability to keep emissions within desired limits while improving the thermal efficiency of such combustor assemblies; etc.

DETAILED DESCRIPTION OF THE INVENTION

Figure 1:
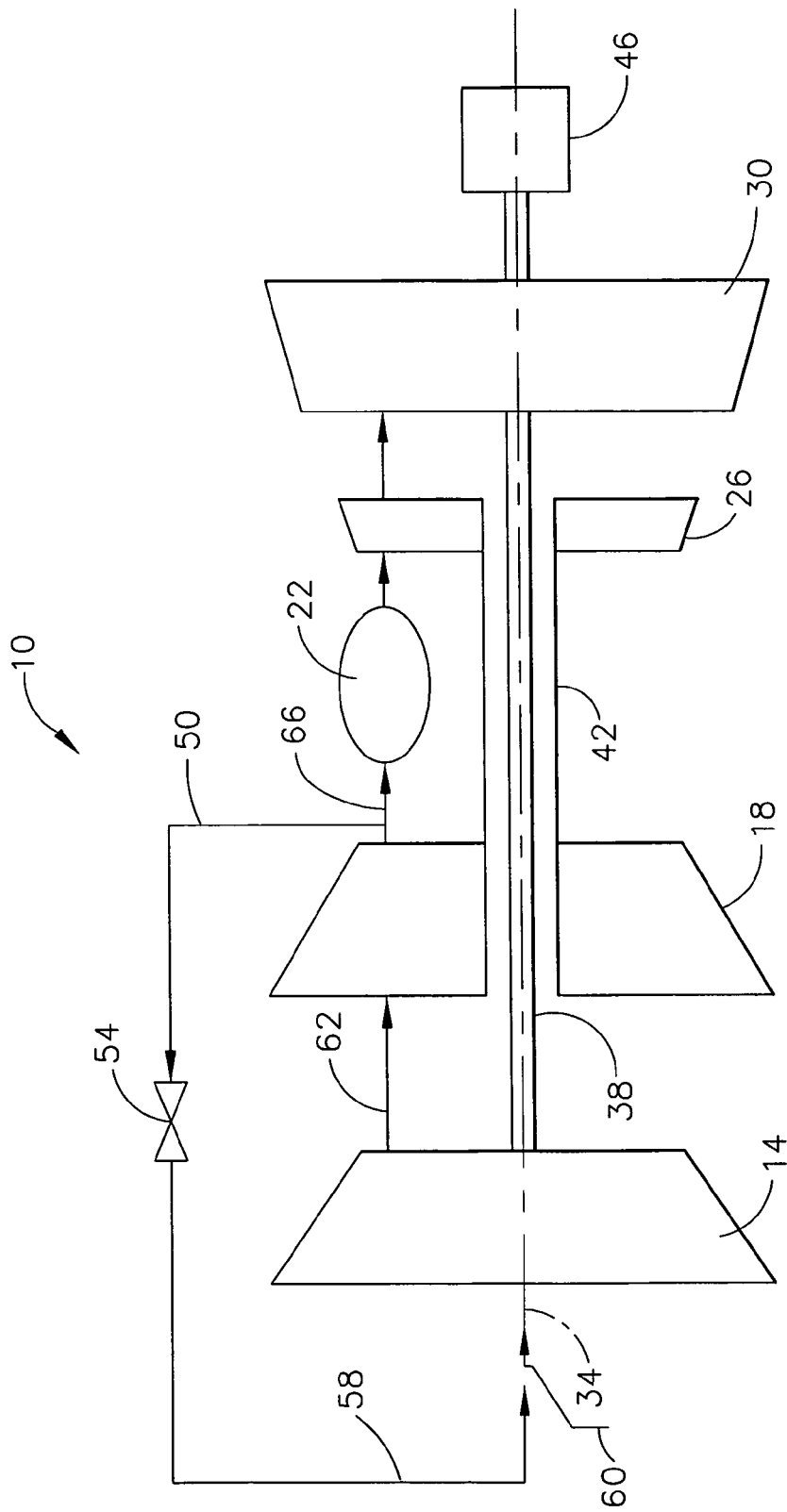
FIG. 1 is a schematic view of an embodiment of the system of this invention having improved thermal efficiency.

As used herein, the term "lean premix" refers to any fuel/air mixture that contains more air than is required to fully combust the fuel in a gas turbine engine, or an equivalence ratio of less than one, to reduce, and typically significantly reduce, thermal (i.e., because of higher combustor flame temperature) NOx emissions.

As used herein, the term "dry low emissions combustor" refers to any gas turbine engine combustor that reduces gas turbine engine emissions, such as nitrous oxides, by using lean premix combustion. Suitable dry low emissions combustors for use herein include triple annular dome combustors such as those disclosed in commonly assigned U.S. Pat. No. 5,323,604 (Ekstedt et al), issued Jun. 28, 1994, U.S. Pat. No. 6,415,594 (Durbin et al), issued Jul. 9, 2002 (both of which are herein incorporated by reference); double annular dome combustors such as those disclosed in commonly assigned U.S. Pat. No. 5,197,278 (Sala et al), issued Mar. 30, 1993 (herein incorporated by reference), etc. Representative commercially available dry low emissions combustors suitable for use herein include dry low emissions combustors present in General Electric Company's LM6000, LM2500 and LM1600 gas turbine engine systems; Rolls Royce's industrial RB 211 and industrial Trent dry low emissions combustors; Pratt & Whitney's FT8-2 dry low emissions combustors; Siemens' GT10B, GT10C, GTX100 and GT35 dry low emissions combustors; etc.

As used herein, the term "bleed air" refers to that portion of the inlet air stream that is received by the combustor assembly and is not mixed with the fuel for combustion, but is instead typically diverted or "bled" overboard (i.e., discarded) through outlets or ports to maintain stable combustion in a dry low emissions combustor i.e., smooth transitions between combustor modes without excessive acoustics, and without lean "blow out."

As used herein, the terms "improve[d] thermal efficiency" and "improving the thermal efficiency" refer interchangeably to any lowering of energy input for the same or similar power output achieved by a dry low emissions combustor, including lower fuel consumption, lower heat rate, better or improved specific fuel consumption (SFC), etc., or any combination thereof.

As used herein, the term "source of warmer air" refers to any source of air that is capable of raising the ambient air temperature of the inlet air stream received by a dry low emissions combustor assembly, by being added to, combined with or otherwise associated with the inlet air stream, so as to improve the thermal efficiency of the combustor. Suitable sources of warmer air can include recycled bleed air, warmer air from other sections of the gas turbine engine, air external to that used in the gas turbine engine (e.g., external to the inlet air stream) that is heated or warmed (e.g., by a heat exchanger), typically by discharged or exhaust air streams of the gas turbine engine, electrical heating, other recycled waste heat streams etc., or any combination of such sources of warmer air.

As used herein, the term "ambient air temperature" refers to the typical atmospheric temperature of the air or air stream in the gas turbine engine system.

As used herein, the term "operating at a full load" refers to the gas turbine engine and typically the combustor operating at its peak power or designed capacity. By contrast, the term "operating at a partial load" refers to the gas turbine engine/combustor operating at a fraction of its peak power or designed capacity, e.g., in a "throttled back" state.

As used herein, the term "new equilibrium state having improved thermal efficiency" refers to the point at which a steady-state improvement in thermal efficiency is reached by the gas turbine engine system after it has been operated for a period of time with the source of warmer air being added to, combined with, or otherwise associated with the inlet air stream.

Referring now to the drawings, FIG. 1 depicts a gas turbine engine system 10 of the type having a low pressure compressor 14, a high pressure compressor 18 downstream of low pressure compressor 14, a combustor assembly 22 downstream of high pressure compressor 18, a high pressure turbine 26 downstream of combustor assembly 22, and a low pressure turbine 30 downstream of high pressure turbine 26. The elements of gas turbine engine 10 rotate about a longitudinal axis indicated as 34. A typical configuration for engines of this type is a dual concentric shafting arrangement, wherein low pressure turbine 30 is drivingly connected to low pressure compressor 14 by a first shaft 38 and high pressure turbine 26 is similarly drivingly connected to high pressure compressor 18 by a second shaft 42 internal and concentric to shaft 38. In the gas turbine engine depicted in FIG. 1, low pressure turbine 30 is connected directly to low pressure compressor 14 and a load 46. An example of such an engine is manufactured by General Electric Company of Evendale, Ohio under the designation LM6000. While the system of this invention is described as being utilized with the gas turbine engine of FIG. 1, it will be understood that it can also be utilized with marine and industrial gas turbine engines of other configurations, such as one including a separate power turbine downstream of low pressure turbine 30 connected to a load (e.g., the LM1600 manufactured by General Electric Company) or a single compressor-turbine arrangement (e.g., the LM2500 manufactured by General Electric Company), as well as aeronautical gas turbine engines and heavy duty gas turbine engines when modified appropriately.

FIG. 1 shows one embodiment of system 10 of this invention for improving the thermal efficiency of combustor assembly 22. As shown in FIG. 1, a bleed air stream indicated as 50 is routed to an amount or volume control mechanism such as a damper control valve indicated as 54. Damper control valve 54 controls the amount or volume of bleed air stream 50 that is routed or cycled back to low pressure compressor 14 as a recycled bleed air stream indicated by arrow 58. Recycled bleed air stream 58 combines, mixes, or otherwise associates with and heats or warms (i.e., increases the temperature of) an ambient air stream indicated by arrow 60 that enters low pressure compressor 14. As a result, and over time, the air stream indicated by arrow 62 that is supplied by compressor 14 to high pressure compressor 18 and then by high pressure compressor 18 as an inlet air stream indicated by arrow 66 to combustor assembly 22 increases in temperature. Over time, the amount or volume of recycled bleed air stream 58 is typically reduced as the temperature of inlet air stream 66 steadily increases. After a period of time during which the temperature of inlet air stream 66 is increased, system 10 will eventually reach a new equilibrium state having improved thermal efficiency, at which point the amount or volume of recycled bleed air stream 58 becomes, at most, minimal.

Figure 2:
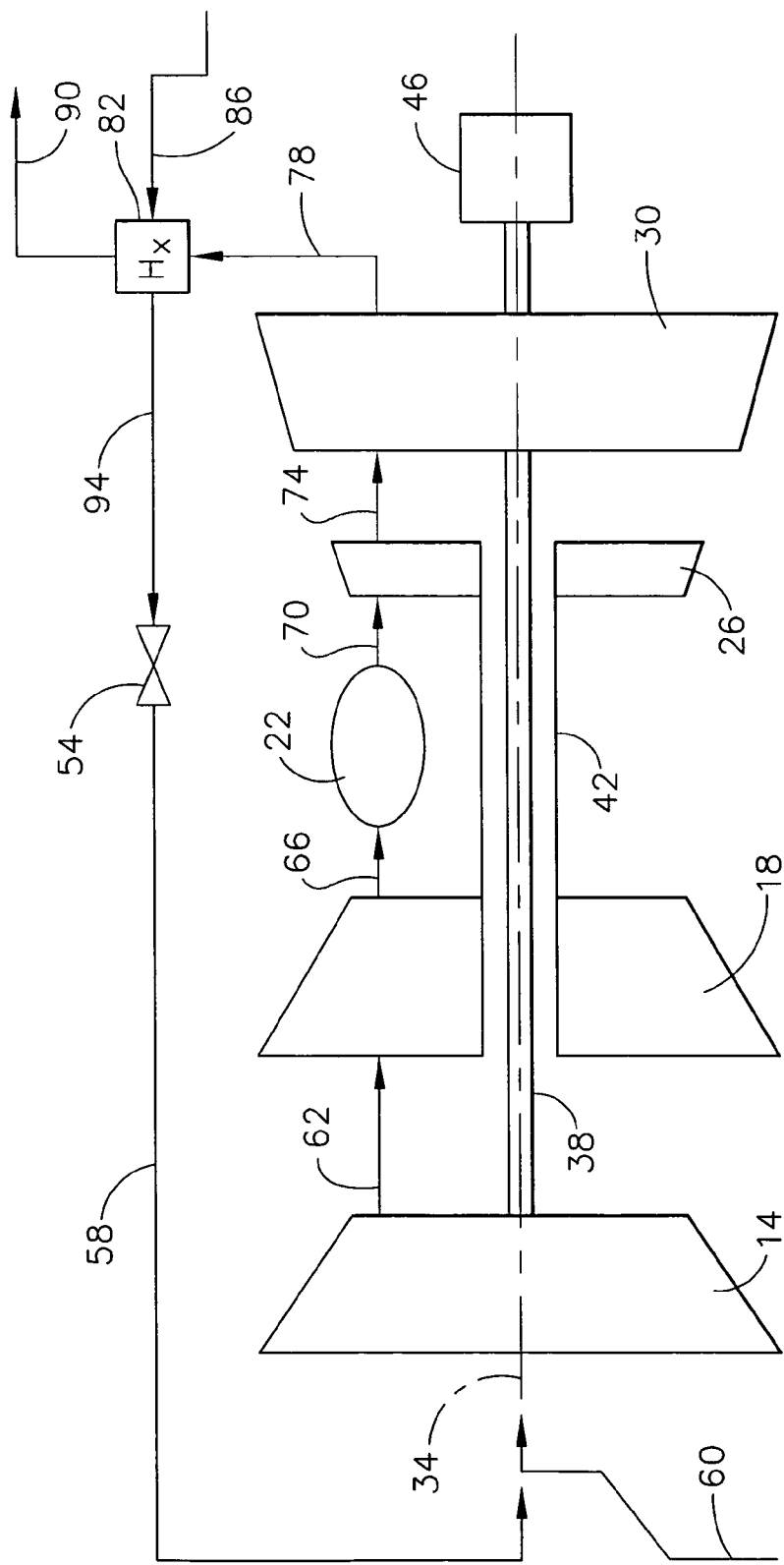
FIG. 2 is a schematic view of an alternative embodiment of the system of this invention having improved thermal efficiency.

FIG. 2 shows an alternative embodiment of system 10 of this invention for improving the thermal efficiency of combustor assembly 22. As shown in FIG. 2, the heated gas stream from combustor assembly 22 indicated by arrow 70 drives a high pressure turbine 26 with some of this heated gas stream indicated by arrow 74 then driving low pressure turbine 30. Some of the residual hot or warm gas stream from a low pressure turbine 30 as indicated by arrow 78 enters a heat exchanger indicated as 82. Residual gas stream 78 heats or warms an external ambient air stream indicated by arrow 86 that enters heat exchanger 82. Residual gas stream 78 leaves heat exchanger 82 as an exhaust gas stream indicated by arrow 90, while external ambient air stream 86, heated or warmed by residual gas stream 78, leaves heat exchanger 82 as a warmed or hot air stream indicated by arrow 94. Hot air stream 94 is cycled back to damper control valve 54 which controls the amount or volume thereof that is used to heat, warm or otherwise increase the temperature of inlet air stream 66, as in the embodiment of system 10 shown in FIG. 1. Over time, the amount or volume of hot air stream 94 is typically reduced as the temperature of inlet air stream 66 steadily increases. After a of period time during which the temperature of inlet air stream 66 is increased, system 10 will eventually reach a new equilibrium state having improved thermal efficiency, at which point the amount or volume of hot air stream 94 becomes, at most, minimal.

Figure 3:
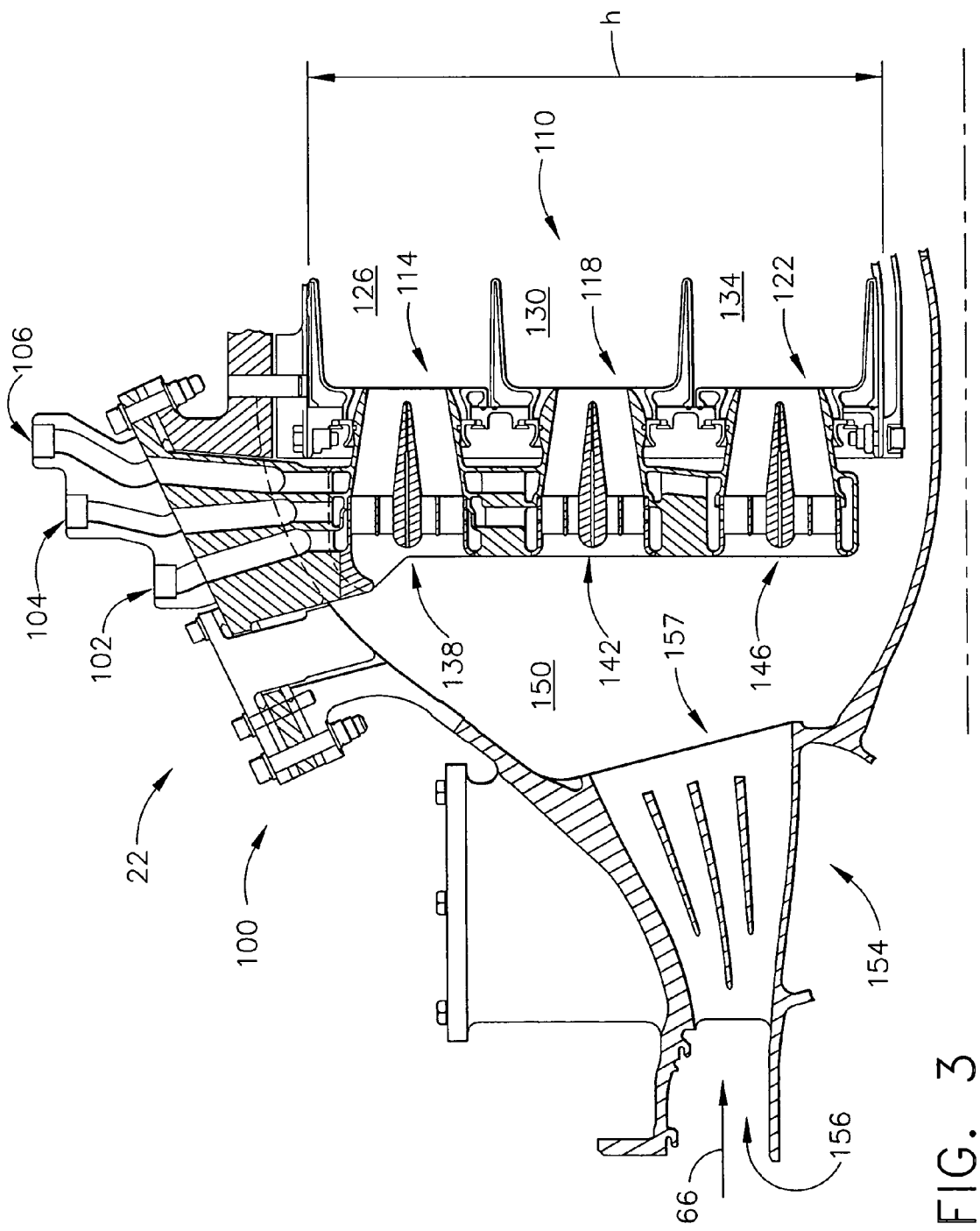
FIG. 3 is a cross-sectional view of the frontal or forward section of a combustor assembly that can be used in the system of FIG. 1 or 2.

FIG. 3 depicts the frontal or forward section of a combustor assembly 22 of the type useful in the system 10 and method of this invention, which comprises a triple annular combustor indicated as 100 having an aft or rearward hollow body (not shown) defining a combustion chamber therein wherein a mixture of fuel from outer, middle and inner dome fuel tubes 102, 104 and 106 and air received by combustor assembly 22 from inlet air stream 66 is ignited to generate power. (It should be noted that triple annular combustor 100 corresponds to that described in commonly assigned U.S. Pat. No. 5,323,604 (Ekstedt et al), issued Jun. 28, 1994, which is incorporated by reference.) At the upstream end of combustor 100 is a domed end 110 having an outer dome 14, a middle dome 18, and an inner dome 122. Dome end 110 of combustor 100 has an overall height h through which air is supplied for mixing with fuel supplied by outer, middle and inner dome fuel tubes 102, 104 and 106 into outer combustion zone 126, middle combustion zone 130 and inner combustion zone 134. Combustor 100 further includes an outer fuel/air mixing mechanism 138, a middle fuel/air mixing mechanism 142 and an inner fuel/air mixing mechanism 146. Upstream thereof is an outlet in the form diffuser dump region indicated as 150 into which air from inlet air stream 66 is eventually supplied from compressor 18 of gas turbine engine system 10 (see FIGS. 1 and 2).

Figure 4:
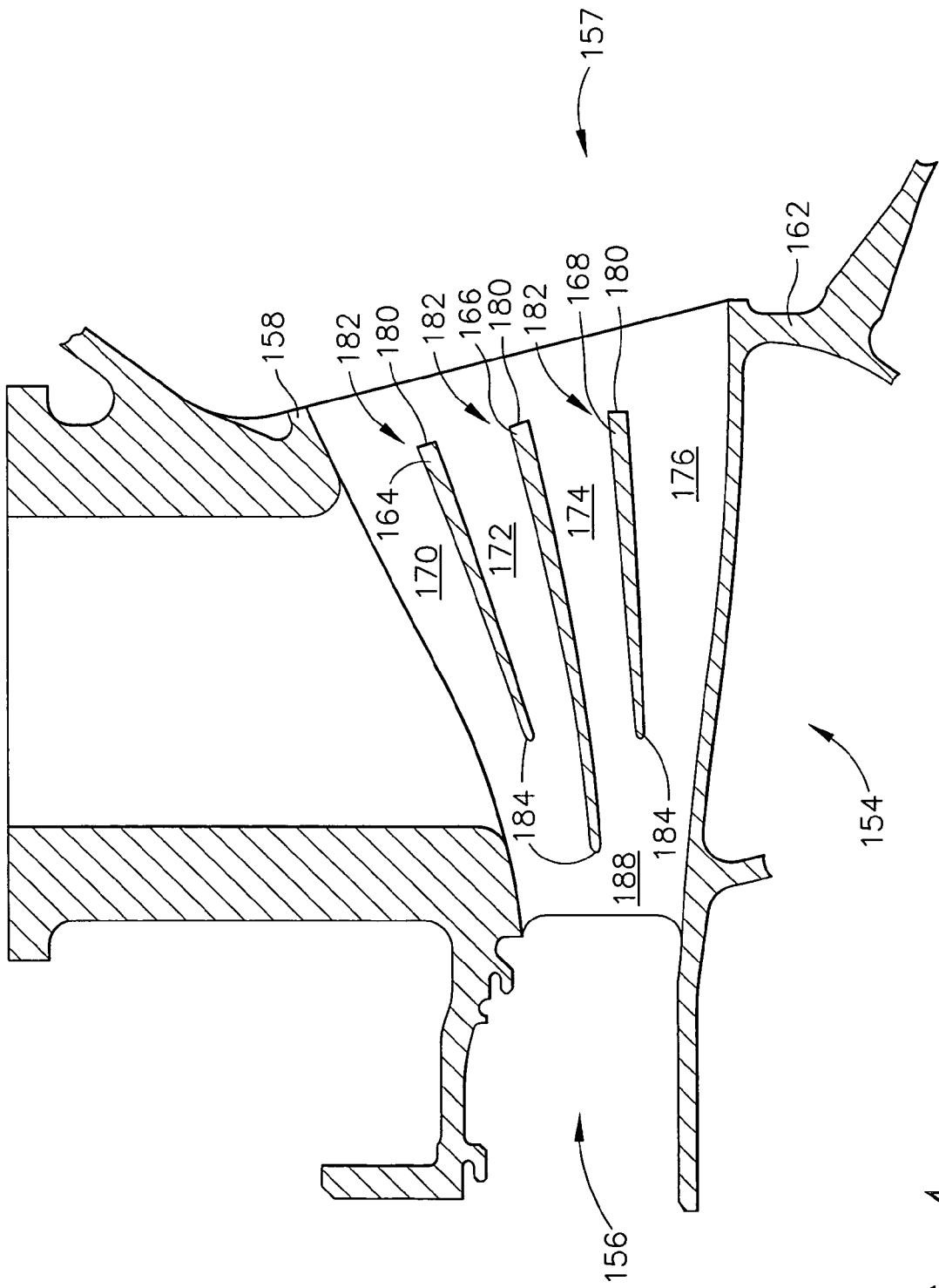
FIG. 4 is an enlarged cross-sectional view of a portion of the diffuser shown in FIG. 3

Channeling the airflow from inlet air stream 66 into diffuser dump region 150 is diffuser 154 of the type disclosed in commonly assigned U.S. Pat. No. 5,335,501 (Taylor), issued Aug. 9, 1994 (herein incorporated by reference) and having an air inlet 156 for receiving inlet air stream 66 and an air outlet 157 for discharging at least a portion of inlet air stream 66 into diffuser dump region 150. Because triple annular combustor 100 typically has a relatively large dome height h (e.g., approximately 10 inches) and typically requires high dome flows to minimize pollutant emissions, diffuser 154 functions to diffuse the compressed airflow from inlet air stream 66 uniformly across dome end 110. As illustrated in FIG. 4, diffuser 154 is an annular diffuser disposed coaxially about a center axis line (not shown), and includes an annular, radially outer, first wall 158 and a radially inner, annular second wall 162 spaced radially inwardly from first wall 158. Provided between outer wall 158 and inner wall 162 is a plurality of circumferential splitter vanes indicated as 164, 166 and 168. A first passage or channel 170 is provided between outer splitter vane 164 and outer wall 158, a second passage or channel 172 is provided between middle splitter vane 166 and outer splitter vane 164, a third passage or channel 174 is provided between inner splitter vane 168 and middle splitter vane 166, and a fourth passage or channel 176 is provided between inner diffuser wall 162 and inner splitter vane 168. With this design, a large diffuser area ratio can be used to provide a high pressure recovery within a short diffuser length.

As shown in FIG. 4, circumferential splitter vanes 164, 166 and 168 have a relatively thicker, bluff base region 180 in order that the compressed airflow from inlet air stream 66 can be spread out radially to produce uniform flow at combustor dome end 110. In addition, splitter vanes 164, 166 and 168 typically are thicker at their trailing edge 182, from which they taper more or less uniformly to a relatively thin leading edge 184. Thin leading edges 184 are typically needed in order to reduce the flow blockage effect in diffuser inlet region 188, the ratio of the thickness of the trailing edge 182 to the thickness of leading edge 184 typically being in range of from about 2 to about 10. As shown in FIG. 4., the respective lengths of splitter vanes 164, 166 and 168 can also be different. As shown in FIG. 4, middle splitter vane 166 typically extends upstream of outer splitter vane 164 and inner splitter vane 168 in order to enhance the ability of the compressed airflow from inlet air stream 66 to flow through channels 170, 172, 174 and 176.

Figure 5:
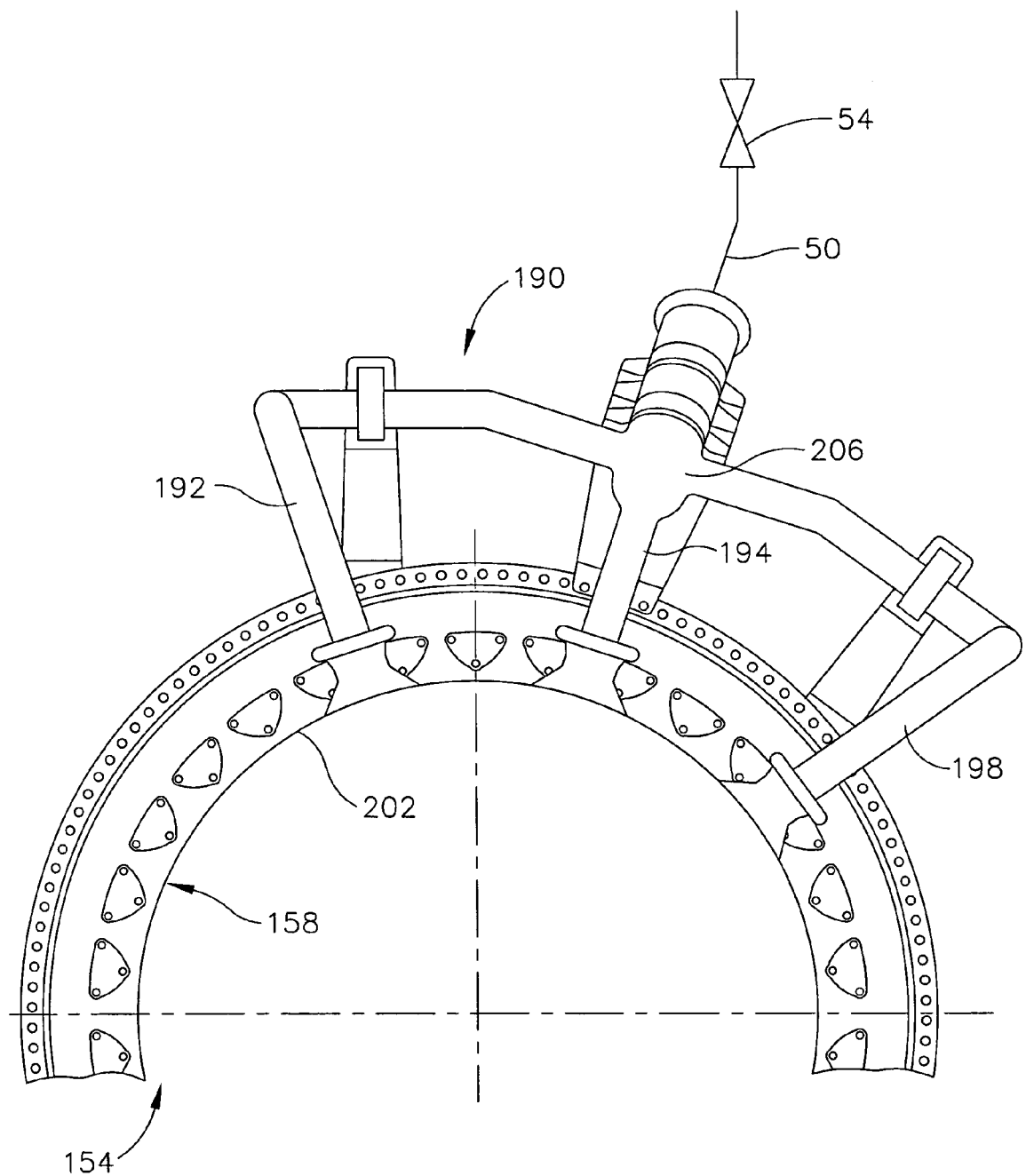
FIG. 5 is frontal view looking aft of a portion of the diffuser of FIG. 3 with accompanying "bleed air ports."

As particularly shown in FIG. 5, diffuser 154 further includes a manifold 190 comprising plurality of bleed air ports indicated as 192, 194 and 198 that are circumferentially spaced apart, are connected to the perimeter 202 of outer wall 158 of diffuser 154 and extend generally radially outwardly from outer wall 158. These bleed air ports 190, 194 and 198 are joined in manifold 190 at a point indicated as 206 to provide a central bleed air outlet indicated as 210. This central bleed air outlet 210 provides the bleed air stream 50.

Figure 6:
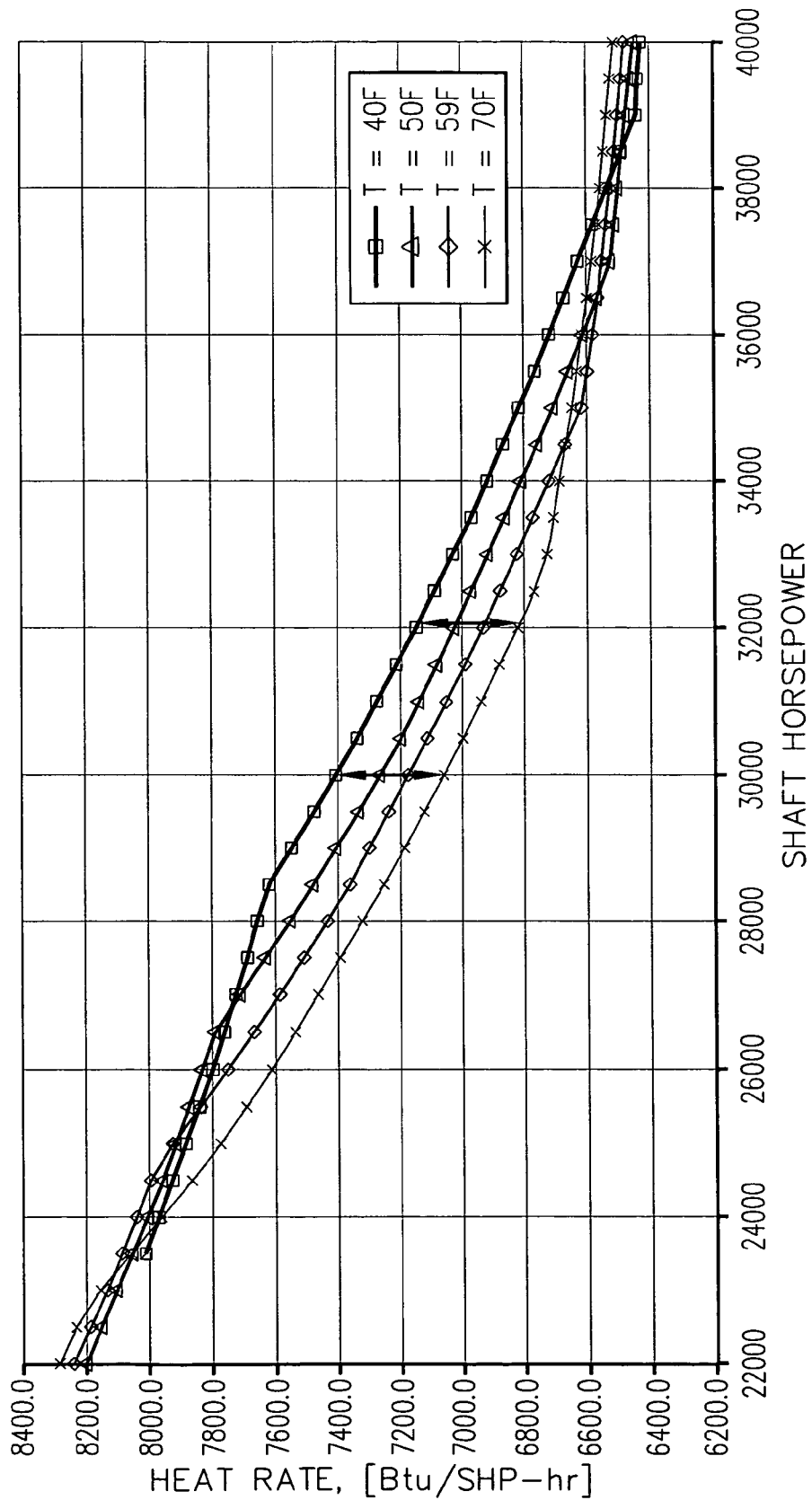
FIG. 6 is a graphical plot of heat rate at different compressor inlet air temperatures versus shaft horsepower of a gas turbine engine system having a dry low emissions combustor assembly.
Figure 7:
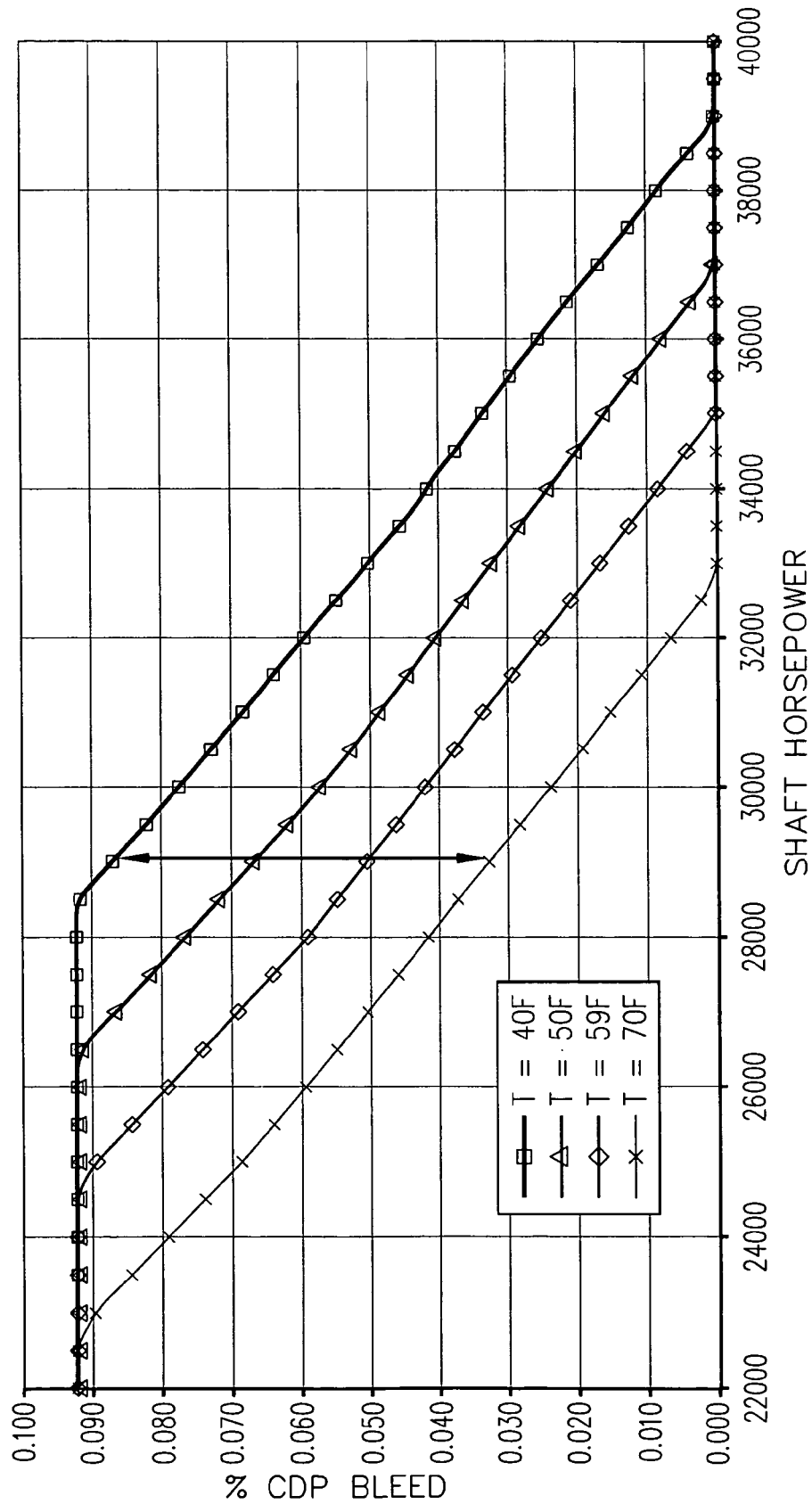
FIG. 7 is a graphical plot of compressor discharge pressure (CDP) "bleed" at different compressor inlet air temperatures versus shaft horsepower of a gas turbine engine system having a dry low emissions combustor assembly.

The improved thermal efficiency of system 10, as represented, for example, by the embodiments shown in FIGS. 1 and 2, is illustrated by the graphical plots shown in FIGS. 6 and 7. FIG. 6 is a graphical plot of "heat rate" (Btu/SHP-hr.) at different compressor inlet air temperatures (T), namely, 40° F. (4.4° C.), 50° F. (10° C.), 59° F. (15° C.) and 70° F. (21° C.), versus shaft horsepower, of an LM2500 gas turbine engine system manufactured by General Electric Company that uses a dry low emissions combustor. FIG. 7 is a graphical plot of the percentage of compressor discharge pressure (CDP) "bleed" at four different compressor inlet air temperatures (T), namely, 40° F. (4.4° C.), 50° F. (10° C.), 59° F. (15° C.) and 70° F. (21° C.), versus shaft horsepower (SHP), of the same LM2500 gas turbine engine system referred to in FIG. 6. As shown by the graphical plot in FIG. 6, heat rate improves (i.e., thermal efficiency increases/improves) as the compressor inlet air temperature increases within a given shaft horsepower range, in this instance for this engine system in the region up to about 85% of full power or load. For example, as shown in FIG. 6, the improvement in heat rate in going from inlet air temperature of T=40° F. (4.4° C.) to T=70° F. (21° C.) at SHPs of approximately 30,000 and 32,000 is about 4.95% and 4.82%, respectively. As shown in FIG. 7, as the compressor inlet air temperature increases, this allows the operation of the combustor to require less "bleed air." For example, as shown in FIG. 7, at an SHP of approximately 29,000, a 30° F. (16.7° C.) increase in the inlet air temperature reduces the CDP bleed requirement from about 8.7% to about 3.3% of total engine airflow.

While specific embodiments of the this invention have been described, it will be apparent to those skilled in the art that various modifications thereto can be made without departing from the spirit and scope of this invention as defined in the appended claims.

What is claimed is:

1. In a gas turbine engine system having improved thermal efficiency, which comprises:
   (1) an inlet air stream; and
   (2) a dry low emissions combustor assembly having an air inlet for receiving the inlet air stream, at least one bleed air port and an air outlet for discharging at least a portion of the air received from the inlet air stream,
   a source of warmer air capable of raising the ambient temperature of the inlet air stream received by the air inlet of the a dry low emissions combustor assembly while operating at a partial load until the system reaches a new equilibrium state having improved thermal efficiency.

2. The system of claim 1 wherein the source of warmer air comprises a bleed air stream recycled from the at least one bleed air port to the inlet air stream.

3. The system of claim 2 wherein the dry low emissions combustor assembly comprises a diffuser that includes the air inlet that receives the inlet air stream and the air outlet that discharges the portion of the received air, and wherein the at least one bleed port extends radially outwardly from the diffuser.

4. The system of claim 2 which further comprises a mechanism for controlling the volume of the bleed air stream that is recycled to the inlet air stream.

5. The system of claim 4 wherein the mechanism for controlling the volume of the bleed air stream that is recycled is a damper control valve.

6. The system of claim 4 wherein the volume of the bleed air stream that is recycled is reduced as the temperature of the inlet air stream increases.

7. The system of claim 1 wherein the source of warmer air comprises a warmed air stream external to that used in the gas turbine engine.

8. The system of claim 7 wherein the warmed external air stream is heated by an exhaust air stream of the gas turbine engine.

9. The system of claim 8 wherein the warmed external air stream and the exhaust air stream pass through a heat exchanger.

10. The system of claim 8 which further comprises a mechanism for controlling the volume of the warmed external air stream that is cycled to the inlet air stream.

11. The system of claim 10 wherein the mechanism for controlling the volume of the warmed external air stream that is cycled to the inlet air stream is a damper control valve.

12. The system of claim 10 wherein the volume of the warmed external air stream that is cycled to the inlet air stream is reduced as the temperature of the inlet air stream increases.

13. A method for improving the thermal efficiency in gas turbine engine system that comprises an inlet air stream, a dry low emissions combustor assembly having an air inlet for receiving the inlet air stream, at least one bleed air port and an air outlet for discharging at least a portion of the received air from the inlet air stream, the method comprising the step of including a source of warmer air with the inlet air stream received by the air inlet of the dry low emissions combustor assembly while operating at a partial load until the system reaches a new equilibrium state having improved thermal efficiency.

14. The method of claim 13 wherein the step of including the source of warmer air comprises recycling a bleed air stream recycled from the at least one bleed air port to the inlet air stream.

15. The method of claim 14 wherein the volume of the bleed air stream that is recycled to the inlet air stream is controlled.

16. The method of claim 15 wherein the volume of the bleed air stream that is recycled is reduced as the temperature of the inlet air stream increases.

17. The method of claim 13 wherein the source of warmer air comprises a warmed air stream external to that used in the gas turbine engine.

18. The method of claim 17 wherein the warmed external air stream is heated by an exhaust air stream of the gas turbine engine.

19. The method of claim 17 wherein the volume of warmed external air stream that is cycled to the inlet air stream is controlled.

20. The method of claim 19 wherein the volume of the warmed external air stream that is cycled to the inlet air stream is reduced as the temperature of the inlet air stream increases.

* * * * *